US012729727B2

(12) United States Patent
Lee

(10) Patent No.: US 12,729,727 B2
(45) Date of Patent: Sep. 8, 2026

(54) RETURN SPRING, BRAKE PAD EQUIPPED WITH RETURN SPRING, AND BRAKE CALIPER EQUIPPED WITH BRAKE PAD

(71) Applicant: HYUNDAI MOBIS CO., LTD., Seoul (KR)

(72) Inventor: Jong Min Lee, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 495 days.

(21) Appl. No.: 18/224,667

(22) Filed: Jul. 21, 2023

(65) Prior Publication Data

US 2024/0141959 A1 May 2, 2024

(30) Foreign Application Priority Data

Oct. 26, 2022 (KR) ........................ 10-2022-0139169

(51) Int. Cl.
*F16D 65/097* (2006.01)
*F16D 65/00* (2006.01)
*F16D 55/00* (2006.01)
*F16D 127/02* (2012.01)

(52) U.S. Cl.
CPC ..... *F16D 65/0971* (2013.01); *F16D 65/0068* (2013.01); *F16D 2055/0029* (2013.01); *F16D 2127/02* (2013.01); *F16D 2200/0021* (2013.01)

(58) Field of Classification Search
CPC ............. F16D 65/0971; F16D 65/0068; F16D 2055/0029; F16D 2127/02; F16D 2200/0021
USPC ...................... 188/73.36–73.38; D8/394–396
See application file for complete search history.

(56) References Cited

U.S. PATENT DOCUMENTS 5,381,875 A * 1/1995 Tsuruta ............... F16D 65/0972 188/73.38
5,649,610 A * 7/1997 Shimazaki .......... F16D 65/0972 188/73.38
5,941,348 A * 8/1999 Matsumoto ......... F16D 65/0972 188/73.38
5,954,163 A * 9/1999 Suzuki .................. F16D 55/227 188/73.38
6,269,915 B1 * 8/2001 Aoyagi ............... F16D 65/0972 188/73.38
9,016,442 B2 * 4/2015 Odaira ................ F16D 65/0006 188/73.38

FOREIGN PATENT DOCUMENTS

KR 10-1628600 B1 6/2016
KR 10-2019-0069884 A 6/2019

* cited by examiner

*Primary Examiner* — Christopher P Schwartz
(74) *Attorney, Agent, or Firm* — Morgan Lewis & Bockius LLP

(57) ABSTRACT

The present disclosure relates to a return spring for a brake caliper, a brake pad equipped with the return spring, and a brake caliper equipped with the brake pad. The return spring includes a main plate formed as a flat plate, a returning portion connected to the main plate and providing a return force resulted from elasticity of the returning portion when the brake pad moves, a load supporting portion connected to the main plate and elastically supporting a load of the brake pad, and a sliding portion connected to the main plate and rubbing against an inner surface of the guide groove when the brake pad moves.

19 Claims, 11 Drawing Sheets

RETURN SPRING, BRAKE PAD EQUIPPED WITH RETURN SPRING, AND BRAKE CALIPER EQUIPPED WITH BRAKE PAD

This application claims the benefit of Korean Patent Application No. 10-2022-0139169, filed on Oct. 26, 2022, which is hereby incorporated by reference as if fully set forth herein.

BACKGROUND

Field

The present embodiments relate to a return spring applicable to vehicles in all fields, and more specifically, to a return spring that is connected to a brake pad and applies a force to return the brake pad. In addition, the present embodiments relate to a brake pad and a brake calipers equipped with a return spring.

Discussion of the Related Art

A brake caliper mounted on a vehicle is a device for decelerating or stopping the traveling vehicle or maintaining the stopped state of the vehicle, and is a device that obtains a braking force by applying a great pressure to a disk rotating together with a vehicle wheel.

In the conventional brake caliper, a brake pad is supported in a movable state, and a pad support pin for guiding a movement of the brake pad and a spring member for elastically supporting an upper portion of a pad plate to prevent vibration of the pad and to ensure a smooth return operation are installed above the brake pad.

However, in such structure of the brake caliper, an elastic force is intensively applied to an upper portion of the brake pad. Therefore, even when the return operation of the upper portion of the brake pad is smooth because of the elasticity, a force may not be transmitted well to a lower portion of the brake pad and the lower portion of the brake pad may be returned in a state in which a brake pad surface is not parallel to a disk surface. When the return operation of the brake pad is incomplete because of such problem, drag characteristics and braking noise are caused, so that there is a need to reduce such problem.

In one example, a conventional pad liner supports a foot of the brake pad as a component mounted inside the brake caliper. The pad liner has a complicated structure, and thus, is difficult to be assembled within the brake caliper. In addition, among the pad liners, there is one integrated with a spring that applies a return force to the brake pad, but it has problems that deformation thereof resulted from the movement of the brake pad is easy because of the structure and the return force is not sufficient.

Background art for an embodiment disclosed herein are disclosed in Korean Patent Publication Application No. 10-2019-0069884 (published on Jun. 20, 2019, title of invention: caliper device) and Korean Patent No. 10-1628600 (published on Jun. 8, 2016, pad liner for brake caliper where drag is reduced).

SUMMARY

Embodiments of the present disclosure are to provide a return spring capable of providing a uniform return force to a brake pad, and a brake pad and a brake caliper to which the corresponding return spring is mounted.

In addition, embodiments of the present disclosure are to provide a return spring capable of supporting a load of a brake pad while providing a return force to the brake pad.

In addition, embodiments of the present disclosure are to provide a return spring that minimizes friction resulted from a movement of a brake pad when mounted on the brake pad.

In addition, embodiments of the present disclosure are to provide a brake caliper that reduces complexity of a brake caliper structure by omitting a conventional pad liner and increases space utilization.

The problems to be solved in the present disclosure are not limited to the technical problems mentioned above, and other technical problems not mentioned will be clearly understood by those with ordinary knowledge in the technical field to which the present disclosure belongs from the description below.

A return spring connected to a brake pad moving along a guide groove defined in a brake caliper according to embodiments of the present disclosure includes a main plate formed as a flat plate, a returning portion connected to the main plate and providing a return force resulted from elasticity of the returning portion when the brake pad moves, a load supporting portion connected to the main plate and elastically supporting a load of the brake pad, and a sliding portion connected to the main plate and rubbing against an inner surface of the guide groove when the brake pad moves.

Preferably, the sliding portion extends parallel to a moving direction of the brake pad from the main plate, and is in surface contact with the brake pad and in surface contact with the inner surface of the guide groove.

Preferably, the sliding portion is in surface contact with a top surface of the guide groove and a front surface of the brake pad.

Preferably, the load supporting portion includes a first end portion extending from the main plate and a second end supporting the inner surface of the guide groove. In addition, the load supporting portion is curved at a predetermined angle with respect to the main plate, and the load supporting portion applies a force to a bottom surface of the guide groove using elasticity. In addition, the load supporting portion is connected to the main plate from a side opposite to the sliding portion.

Preferably, the returning portion includes a first end portion extending from the main plate and a second end portion supporting a fixed area of the brake caliper. In addition, the returning portion has a curved section, and the other end of the returning portion includes a curved surface in a portion for supporting the fixed area.

The returning portion includes a first section curved at a first portion of the returning portion at a first angle and a second section curved at a second portion of the returning portion at a second angle, and a sum of the first angle and the second angle is at least 180 degrees.

Preferably, the returning portion is connected to a partial section of an upper edge of the main plate, and the sliding portion is connected to a remaining section of the upper edge of the main plate.

Preferably, the main plate further includes a hole defined therein for connection with the brake pad.

A brake pad with the return spring according to embodiments includes a plurality of protruding portions protruding in a lateral direction symmetrically with respect to a pad surface.

The protruding portion includes a protrusion, and the protrusion passes through a hole defined in a main plate of the return spring. A top surface and front surface of the protruding portion are in contact with a sliding portion of the return spring.

A brake caliper equipped with the brake pad according to embodiments includes a pad carrier having a guide groove defined therein for guiding a protruding portion of the brake pad in a front and rear direction, and the pad carrier is fixed to a knuckle assembly of a vehicle wheel.

Preferably, the pad carrier and the return spring are made of steel use stainless (SUS).

According to any one of the embodiments of the present disclosure, reliability of the return operation of the brake pad is secured to reduce the drag and the braking noise.

In addition, the brake caliper structure may be simplified as the return spring, which is a single part, provides the return force to the brake pad and supports the load of the brake pad at the same time.

In addition, efficiency of the brake pad operation may be improved by reducing the friction caused by the movement of the brake pad.

In addition, ease of assembly and productivity of the brake caliper may be increased with the simplified structure.

According to any one of the embodiments of the present disclosure, a weight of the brake caliper may be reduced and a manufacturing cost thereof may be reduced.

Effects obtainable from the present disclosure are not limited to the effects mentioned above, and other effects not mentioned will be clearly understood by those skilled in the art from the description below.

DESCRIPTION OF SPECIFIC EMBODIMENTS

Figure 1:
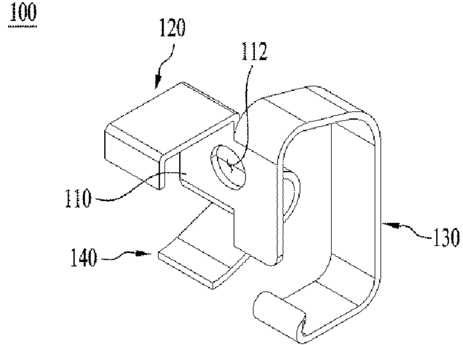
FIG. 1 is a perspective view of a return spring according to any one of embodiments of the present disclosure.

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component. Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath" another component may be placed "above" said another component. Accordingly, the exemplary term "below" may include both downward direction and upward direction. Components may also be oriented in other directions, and thus, spatially relative terms may be interpreted based on the orientation.

Figure 2:
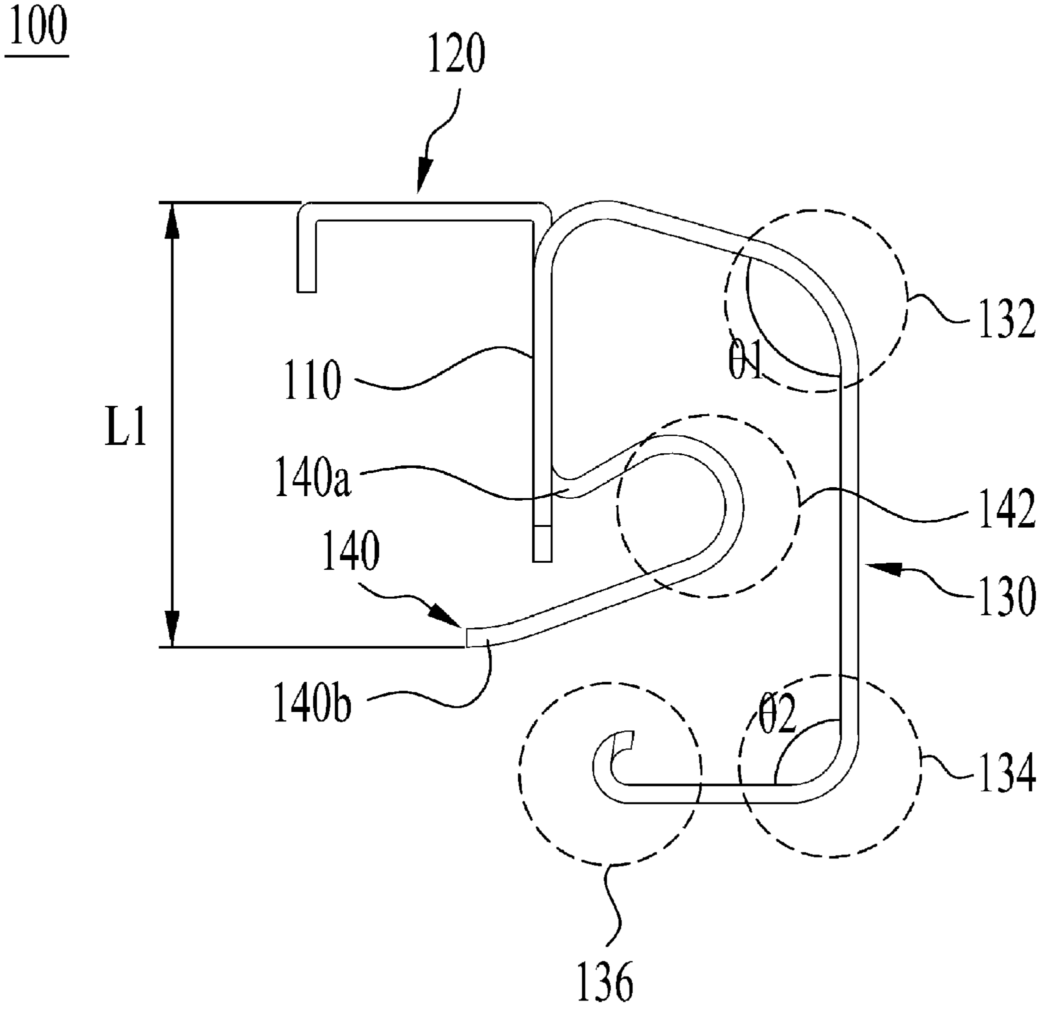
FIG. 2 shows a side surface of a return spring according to any one of embodiments of the present disclosure.

FIG. 1 is a perspective view of a return spring 100 (hereinafter, referred to as a "return spring") according to any one of embodiments of the present disclosure. FIG. 2 shows a side surface of the return spring 100.

In describing the return spring 100, directions such as forward, rearward, upward, and downward directions will be described with reference to FIG. 1. The forward direction indicates a direction in which a surface of a main plate 110 shown in FIG. 1 is directed, and the upward direction indicates a direction in which a surface of a sliding portion 120 shown in FIG. 1 is directed.

Regarding a brake caliper mounted on a wheel of a vehicle, the return spring 100 is connected to a brake pad 200, and the brake pad 200 moves along a guide groove 310 defined inside the brake caliper. The brake pad 200 may apply braking to the vehicle wheel by rubbing against a brake disk (not shown) mounted on the vehicle wheel using a hydraulic pressure or a driving force of a motor.

In one example, when the brake pad 200 does not return immediately after rubbing against the brake disk, vibration and noise may be induced. The return spring 100 may provide a return force to the brake pad 200 such that the brake pad 200 returns immediately after the pressure is released.

The brake pad 200 includes protruding portions 220 protruding from left and right side surfaces of the pad. The protruding portions 220 may be formed on the brake pad 200 symmetrically with respect to a surface of the pad. The protruding portion 220 protruding from the side surface of the brake pad 200 may move along the guide groove 310 of a pad carrier 300, so that a movement of the brake pad 200 may be guided.

The return spring 100 may be connected to the protruding portion 220 of the brake pad 200. Therefore, the brake pad 200 may receive the return force uniformly on the pad surface.

The pad carrier 300 is one of components constituting the brake caliper. The pad carriers 300 may guide the movement of the brake pad 200 on both (e.g., left and right) side surfaces of the brake pad 200, and support the brake pad 200.

In addition, the pad carrier 300 may provide a position of a pad liner (not shown) for supporting a foot load of the brake pad 200. The pad carrier 300 may be connected to a caliper body 400 by appropriate fixing parts (e.g., a fixing pin). In addition, a lower end of the pad carrier 300 may be connected to a knuckle assembly (not shown) coupled to the vehicle wheel so as to fasten the brake caliper to the vehicle wheel.

A material and a shape of each of the caliper body 400 and the pad carrier 300 may be variously determined in consideration of positions, loads, and the like of other components. Preferably, the materials of the caliper body 400 and the pad carrier 300 include a metal-based material. The caliper body 400 and the pad carrier 300 may be made of the metal-based material having an appropriate strength to support a reaction force resulted from braking or a braking torque acting on the brake pad 200.

Figure 10:
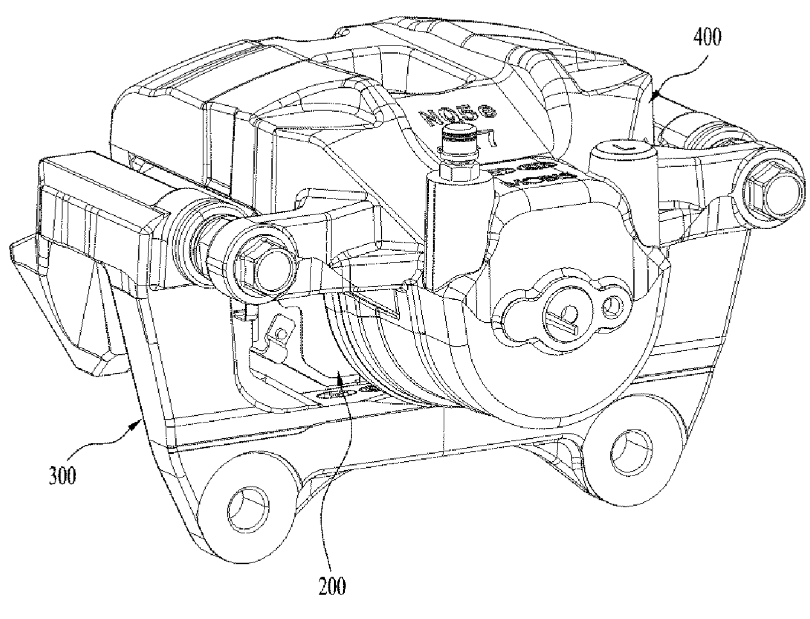
FIG. 10 is a perspective view of a brake caliper according to any one of embodiments of the present disclosure.

Referring to FIG. 10, the caliper body 400 has an open shape such that both side surfaces of the brake pad 200 are exposed, and is connected to a rear surface of the brake pad 200. The caliper body 400 may have a cylinder space that may accommodate hydraulic components or motor components capable of applying a pressure to the rear surface of the brake pad 200. Although not shown in detail in the drawing, the brake caliper may include components that provide power to move the brake pad 200.

The pad carrier 300 may be connected to the side surface of the brake pad 200 to support the brake pad 200 or guide a moving direction of the brake pad 200.

Referring to FIGS. 1 and 2, the return spring 100 includes the main plate 110, the sliding portion 120, a returning portion 130, and/or a load supporting portion 140.

The main plate 110 is constructed as a flat plate and is connected to the protruding portion 220 of the brake pad 200. The main plate 110 may further include a hole 112 defined at a center of the plate, and the hole 112 may be used for connection with the brake pad 200. For example, the main plate 110 and the brake pad 200 may be connected to each other by passing the protrusion 222 disposed on the protruding portion 220 of the brake pad 200 through the hole 112.

The main plate 110 may be connected to the protruding portion 220 of the brake pad 200 in contact with a front surface or a rear surface thereof. A shape of the main plate 110 may vary depending on a shape of the front or rear surface of the protruding portion 220. That is, the shape of the main plate 110 may vary to various shapes such as a circular shape, a triangular shape, and other polygonal shapes as well as a rectangular shape as shown in the drawing.

The sliding portion 120 is a component capable of reducing friction caused by the movement of the brake pad 200. The sliding portion 120 may extend from an upper edge of the main plate 110 in a direction surrounding the protruding portion 220. Therefore, the sliding portion 120 comes into surface contact with the protruding portion 220 of the brake pad 200, and rubs against an inner surface of the guide groove 310 defined in the pad carrier 300 when the brake pad 200 moves. The direction in which the sliding portion 120 extends from the main plate 110 is parallel to a direction in which the brake pad 200 moves. The sliding portion 120 surrounds an upper area of the protruding portion 220 of the brake pad 200 and is in contact with an upper surface of the guide groove 310.

In addition, an end of the sliding portion 120 may be bent so as to be in contact with the front surface of the protruding portion 220. The sliding portion 120 may cover an edge of the protruding portion 220 with the bent portion thereof. That is, the sliding portion 120 may have a shape in contact with not only a top surface of the protruding portion 220 but also the front or rear surface thereof. Therefore, even when the brake pad 200 moves in the forward and rearward directions, the coupling between the return spring 100 and the brake pad 200 may be firmly maintained.

The sliding portion 120 reduces a frictional resistance generated when the brake pad 200 moves by preventing the protruding portion 220 from directly rubbing against the inner surface of the guide groove 310. When the protruding portion 220 protruding from a pad plate 210 of the brake pad 200 directly rubs against the guide groove 310, problems such as loss of paint on the pad plate 210 or rusting may occur. However, the aforementioned problems may be prevented by the sliding portion 120. In addition, the sliding portion 120 strengthens the coupling between the return spring 100 and the brake pad 200.

The inner surface of the guide groove 310 and the sliding portion 120 may be made of the same material, which is steel use stainless (SUS), and may be subjected to a Teflon surface treatment so as to further reduce the frictional resistance.

The load supporting portion 140 is a component capable of supporting a load of the brake pad 200. The load supporting portion 140 may have one end **140*a* connected to a lower edge of the main plate 110, and have a section 142 of extending in the rearward direction, then being curved in the downward direction, and then being curved in the forward direction. Because of such shape, the other end 140*b* of the load supporting portion 140 is located at a point spaced apart from the lower edge of the main plate 110** by a predetermined distance.

The load supporting portion 140 may be connected at a side opposite to the sliding portion 120 with respect to the main plate 110.

The other end **140*b* of the load supporting portion 140 supports a bottom surface of the guide groove 310. Because of the shape described above, the load supporting portion 140 may have elasticity in the vertical direction. That is, when a force is applied to the other end of the load supporting portion 140 in the upward direction, an elastic force is generated in the downward direction because of the elasticity. The return spring 100 may receive the load of the brake pad 200 and transfer the load to the bottom surface of the guide groove 310 via the load supporting portion 140**.

Figure 9:
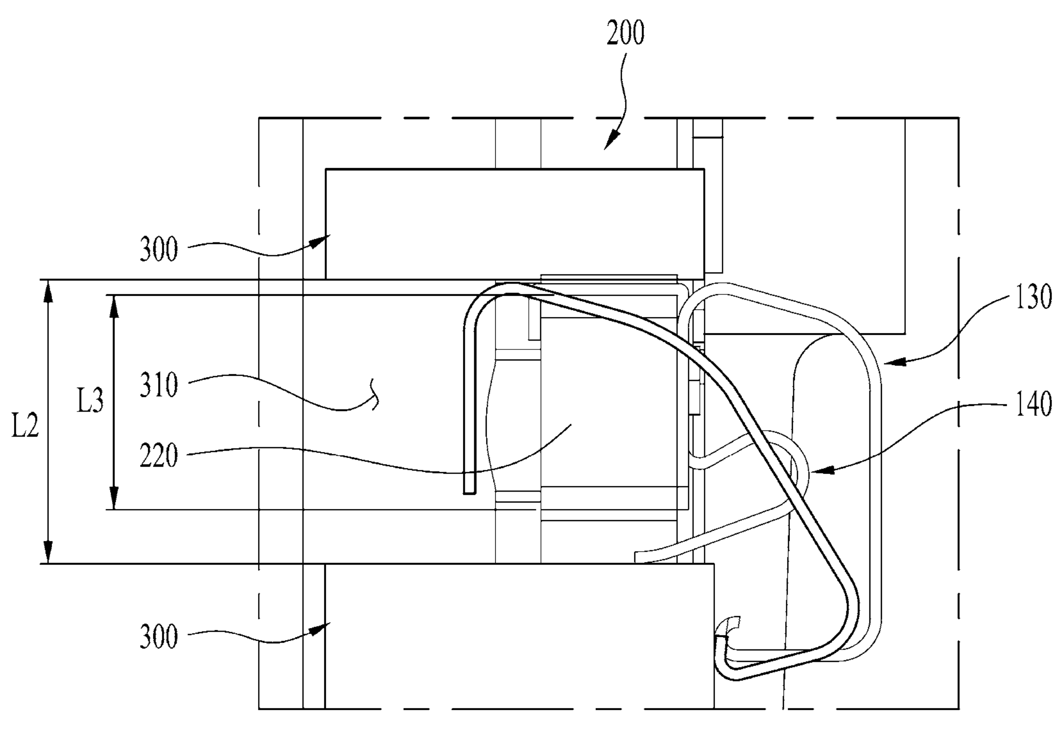
FIG. 9 shows a behavior of a returning portion of a return spring according to any one of embodiments of the present disclosure.

A vertical distance between the sliding portion 120 and the other end of the load supporting portion 140 (e.g., L1 in FIG. 2) may be greater than a distance between the top and bottom surfaces of the guide groove 310 (e.g., L2 in FIG. 9). Accordingly, the other end of the load supporting portion 140 may be compressed in the upward direction within the guide groove 310, and the elastic force of the load supporting portion 140 may act to bring the sliding portion 120 into close contact with the top surface of the guide groove 310.

A curved shape of the curved section 142 of the load supporting portion 140 may not be limited to that in the embodiment in the drawing and may vary. The curved shape of the curved section 142 may be appropriately changed by those skilled in the art in a shape that is advantageous in generating the elastic force in the vertical direction as the other end of the load supporting portion 140 is positioned so as to be spaced downwardly apart from the lower edge of the main plate 110 by the predetermined distance, and an appropriate curve is formed between one end and the other end of the load supporting portion 140. Alternatively, the curved section 142 may be omitted.

The returning portion 130 is a component that applies an elastic force (or a return force) in the rearward direction when the brake pad 200 moves in the forward direction. The returning portion 130 may have one end connected to an upper edge of the main plate 110, and have a first section 132 of extending in the rearward direction and then being curved in the downward direction, and a second section 134 of extending in the downward direction and then being curved in the forward direction. The returning portion 130 may be curved at a first angle (e.g., θ1 in FIG. 2) in the first section 132 and curved at a second angle (e.g., θ2 in FIG. 2) in the second section 134. A sum of the first angle and the second angle may be at least 180 degrees.

The other end of the returning portion 130 is spaced apart from the edge of the main plate 110 by a predetermined distance. The other end of the returning portion 130 may support an arbitrary fixed area on the brake caliper when the brake pad 200 moves.

When the brake pad 200 moves, the return spring 100 connected to the protruding portion 220 of the brake pad 200 also moves together. Accordingly, a position of the return spring 100 changes, but the other end of the returning portion 130 supports the same area on the brake caliper. Eventually, because a shape of the returning portion 130 is changed, the return force acts on the brake pad 200 because of the elastic force for returning the returning portion 130 to an original state thereof.

The other end of the returning portion 130 is not located inside the guide groove 310. The fixed point (or area) of the brake caliper supported by the other end of the returning portion 130 may be a point on a rear surface of the pad carrier (or torque member) 300 or may be a point on a rear surface of the caliper body 400.

In this regard, the front surface and the rear surface are defined based on the brake pad 200 to which the return spring 100 is connected. A direction in which the brake pad 200 moves toward the brake disk (not shown) is the forward direction, and an opposite direction thereof is the rearward direction.

In one example, the other end of the returning portion 130 may have a curved surface 136 at a portion in contact with the fixed point (or area). The other end of the returning portion 130 may be curved with a predetermined curvature, and an outer surface of the curved portion may be formed as a curved surface and come into contact with the aforementioned fixed point. A friction of the contact portion of the curved surface is reduced.

Referring to FIG. 1, the returning portion 130 and the sliding portion 120 are connected to the upper edge of the main plate 110. Accordingly, a partial section of the upper edge of the main plate 110 may be connected to the returning portion 130, and the remaining section of the upper edge may be connected to the sliding portion 120.

As another embodiment, the returning portion may be changed in various shapes. The returning portion may extend from a side edge or the lower edge of the main plate 110. In addition, the returning portion may be curved as a whole, or may further include curved third section and fourth section. That is, the returning portion may be changed in various ways such that one end thereof is connected to the main plate 110 and the other end thereof comes into contact with the fixed point on the brake caliper outside the guide groove 310.

Figure 3:
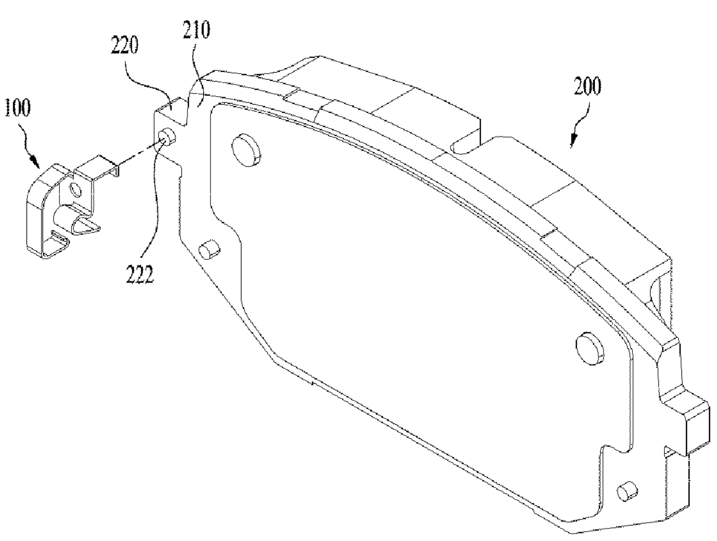
FIG. 3 shows connection between a return spring according to any one of embodiments of the present disclosure and a brake pad.
Figure 4:
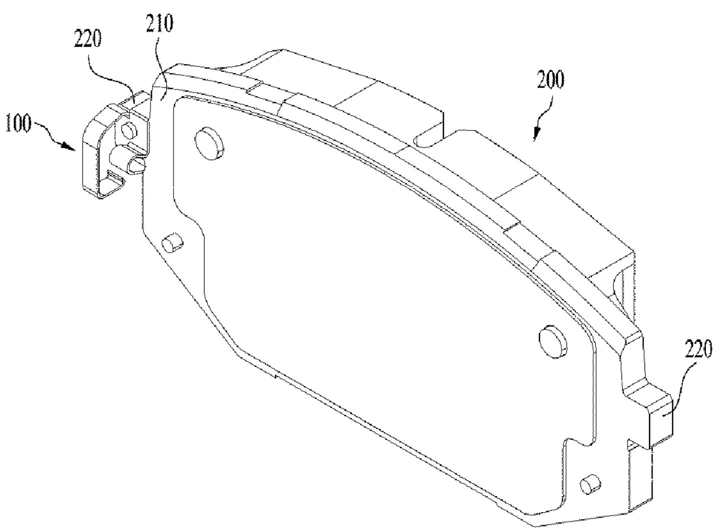
FIG. 4 shows a state in which a return spring and a brake pad are connected to each other, according to any one of embodiments of the present disclosure.

FIGS. 3 and 4 show the connection between the return spring 100 and the brake pad 200.

Referring to FIGS. 3 and 4, the protruding portions 220 are disposed symmetrically on both side surfaces of brake pad 200, and each protruding portion 220 includes the protrusion 222 on the rear surface thereof. When connecting the return spring 100 and the brake pad 200 to each other, the protrusion 222 of the protruding portion 220 may pass through the hole 112 of the main plate 110 of the return spring 100.

In one example, the protruding portion 220 may protrude from an intermediate area in the vertical direction of the side surface of the brake pad 200. That is, a position where the protruding portion 220 protrudes is appropriately the intermediate area without being excessively biased in the upward direction or the downward direction on the side surface. For example, when a vertical dimension of the brake pad 200 is divided into three parts, the protruding portion 220 may protrude from an area located in the middle. Therefore, the return force of the return spring 100 may act equally in the vertical direction on the brake pad 200.

As another embodiment, the return spring 100 may be connected to the brake pad 200 in various fixing schemes. The return spring 100 may be connected to the protruding portion 220 of the brake pad 200 by drilling the main plate 110 using a rivet, or well-known fixing schemes such as bolt bonding may be applied.

Figure 5:
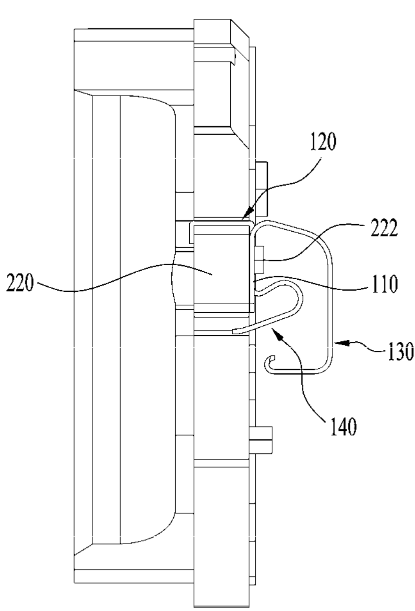
FIG. 5 shows a side surface of a brake pad to which a return spring is connected, according to any one of embodiments of the present disclosure.
Figure 6:
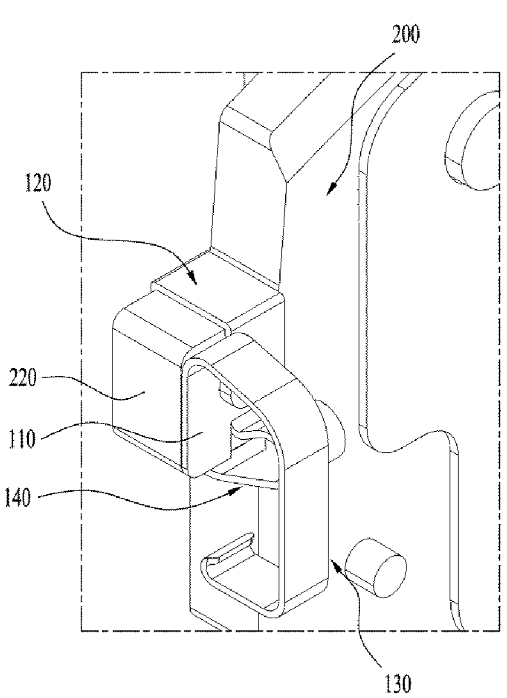
FIG. 6 is a perspective view of a protruding portion of a brake pad to which a return spring is connected, according to any one of embodiments of the present disclosure.

FIG. 5 shows a side surface of the brake pad 200 to which the return spring 100 is connected. FIG. 6 is a perspective view of the protruding portion 220 of the brake pad 200 to which the return spring 100 is connected.

Referring to FIGS. 5 and 6, the main plate 110 is coupled to the rear surface of the protruding portion 220, and the sliding portion 120 is formed to cover the top surface and a portion of the front surface of the protruding portion 220. The load supporting portion 140 is connected to the main plate 110, and the other end thereof is spaced downwardly apart from the protruding portion 220 by the predetermined distance. The returning portion 130 may be connected to the main plate 110, and the other end thereof may be spaced apart from the rear surface of the brake pad 200 by the predetermined distance.

Figure 7:
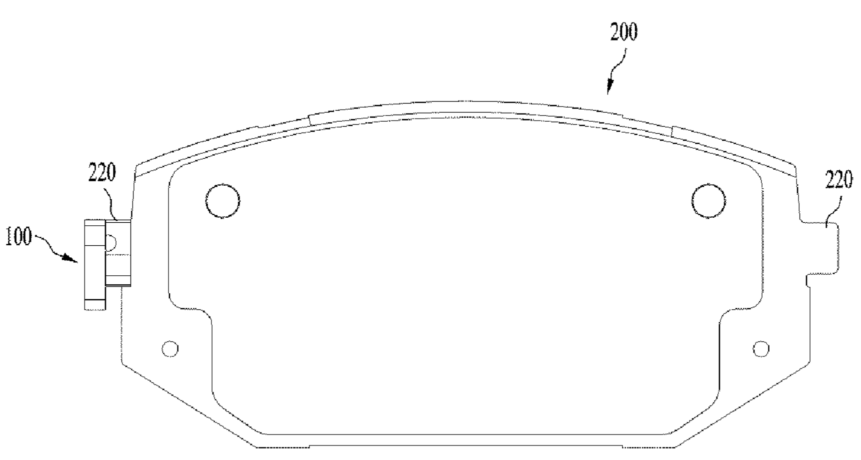
FIG. 7 shows a rear surface of a brake pad according to any one of embodiments of the present disclosure.

FIG. 7 shows the rear surface of the brake pad 200. Referring to FIG. 7, the return spring 100 is coupled to one of a plurality of protruding portions 220 symmetrically disposed. A plurality of return springs 100 may be respectively connected to the plurality of protruding portions 220.

Figure 8:
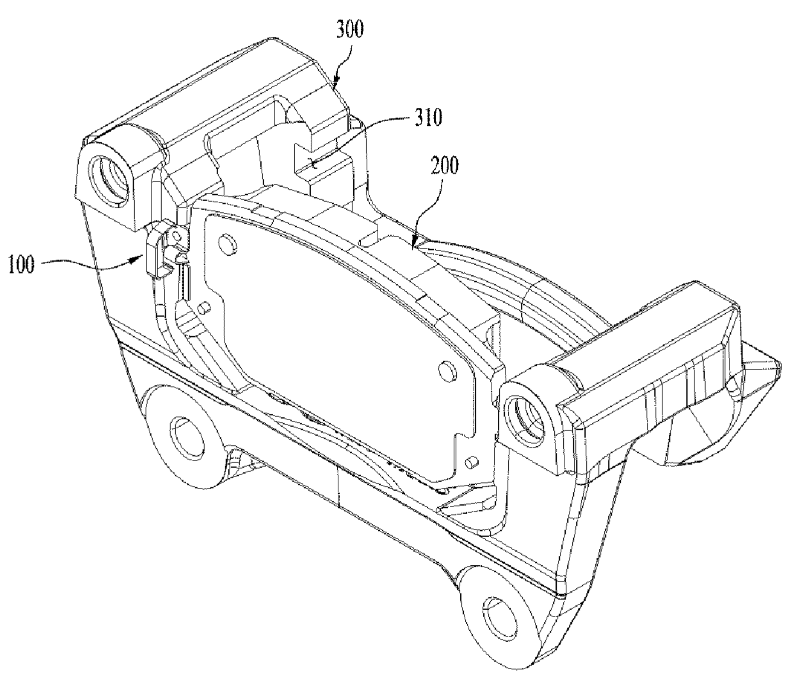
FIG. 8 shows a portion of a brake caliper according to any one of embodiments of the present disclosure.

FIG. 8 shows a portion of a brake caliper. Referring to FIG. 8, the brake caliper may include the brake pad 200 to which the return spring 100 is connected, and the pad carrier 300 having the guide groove 310 defined therein for guiding the brake pad 200. In FIG. 9, the brake caliper 400 is omitted to show a connection relationship between the pad carrier 300 and the brake pad 200.

Although FIG. 8 shows one brake pad 200, two brake pads 200 may be disposed on the pad carrier 300 facing each other. Accordingly, the pad carrier 300 may include a plurality of guide grooves 310 corresponding to the plurality of brake pads 200.

Referring to FIG. 8, the guide groove 310 has a shape of a groove corresponding to the shape of the protruding portion 220 and is defined parallel to the direction in which the brake pad 200 moves forward or rearward. The guide groove 310 has the top surface, the bottom surface, and the side surfaces formed at groove boundaries to guide the protruding portion 220 having a rectangular parallelepiped shape.

The distance between the top surface and the bottom surface of the guide groove 310 is greater than a vertical dimension of the protruding portion 220, but smaller than the distance from the sliding portion 120 of the return spring 100 to the other end of the load supporting portion 140. Therefore, the return spring 100 located inside the guide groove 310 may be in a state in which the load supporting portion 140 is slightly pressed, and may push the brake pad 200 in the upward direction with the elastic force.

FIG. 9 shows deformation of the returning portion 130 based on the movement of the brake pad 200. At a normal position of the brake pad 200, the load supporting portion 140 elastically pushes the bottom surface of the guide groove 310 and the sliding portion 120 is in contact with the top surface of the guide groove 310. In this regard, the returning portion 130 is in an undeformed state. In FIG. 9, L2 represents a distance between a top surface and a bottom surface of the guide groove 310. L3 represents a vertical dimension of a protruding portion (e.g., 220 in FIG. 7).

In this regard, assuming that the brake pad 200 has moved in the forward direction, the returning portion 130 is deformed. In this regard, the other end of the returning portion 130 supports a fixed point (or area) on the rear surface of the pad carrier 300. When the brake pad 200 moves, the return spring 100 tries to move as well, but the other end of the returning portion 300 is caught on the pad carrier 300. Accordingly, the returning portion 130 may be deformed, and the return force may be applied to the brake pad 200 because of the elasticity for the deformed portion to return to an original state thereof.

FIG. 10 is a perspective view of a brake caliper according to embodiments of the present disclosure.

The brake caliper includes the caliper body 400. The caliper body 400 may have a space capable of accommodating the brake pad 200 therein, and may further include a cylinder capable of moving the brake pad 200. The cylinder may make the brake pad 200 move forward by pushing the rear surface of the brake pad 200 with an actuator using the hydraulic pressure or the driving force of the motor.

The caliper body 400 is connected to the pad carrier 300. When there are the two brake pads 200 facing each other, the caliper body 400 may have a shape surrounding upper portions and rear surfaces of the brake pads 200, and the pad carrier 300 may have a shape surrounding both side surfaces and the bottom surface of each of the brake pads 200. The caliper body 400 or the pad carrier 300 may be composed of a combination of a plurality of parts.

Figure 11:
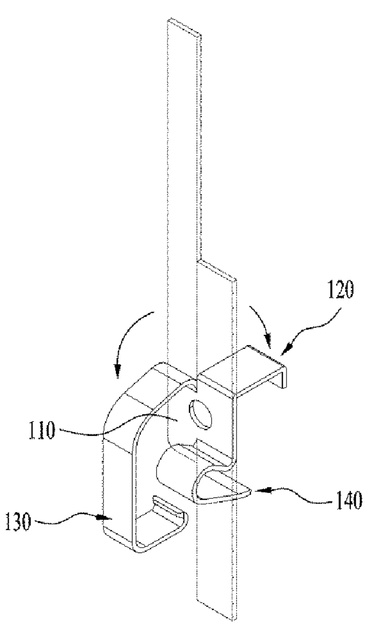
FIG. 11 shows a method for manufacturing a return spring according to any one of embodiments of the present disclosure.

FIG. 11 shows a method for manufacturing the return spring 100.

The return spring 100 may be manufactured from the flat plate-shaped material. The return spring 100 may be manufactured by appropriately cutting the flat plate-shaped material based on a designed shape, and bending or curving a portion of the cut material that will become the component based on the area where the main plate 110 is located along a folding direction of a development drawing.

A shape of the cut flat plate-shaped material may vary based on the return spring according to various embodiments.

The return spring 100 according to the embodiments may be made of the SUS material. In addition, the material of the return spring 100 may include various materials having appropriate elasticity and strength.

The components of the return spring 100 according to the embodiments may be manufactured by bonding materials having different properties to each other. For example, the sliding portion 120 and the returning portion 130 may be made of different materials having different properties such as a spring constant and a damping rate.

The return spring 100 according to the embodiments may be manufactured by bending or curving each area from the flat plate-shaped material or may be manufactured by bonding different types of materials to each other.

When the return spring according to the embodiments of the present disclosure is used, a simplification of a brake caliper manufacturing process and a cost reduction effect resulted from material cost reduction may be expected, and product quality control is easy.

In addition, parts constituting the brake caliper are simplified to create a free space inside the brake caliper and increase a degree of freedom in product design.

In addition, because root causes of chronic problems of the part referred to as the pad liner may be removed, a performance quality of the brake caliper is improved.

It is understood that the description of the various embodiments of the present disclosure is not limited only to the corresponding embodiments, and the technical ideas of the respective embodiments may also be applied to other embodiments.

As described above, the detailed description of the preferred embodiments of the present disclosure is provided such that those skilled in the art may implement and practice the present disclosure. Although the description has been made above with reference to the preferred embodiments of the present disclosure, those skilled in the art will understand that the present disclosure may be modified and changed in various ways within a range that does not deviate from the scope of the present disclosure. For example, those skilled in the art may use the respective components described in the above-described embodiments in a way of combining them to each other.

Thus, the present disclosure is not intended to be limited to the embodiments illustrated herein but is to be accorded the widest scope consistent with the principles and novel features disclosed herein.

What is claimed is:

1. A return spring connected to a brake pad moving along a guide groove defined in a brake caliper, the return spring comprising:

a main plate formed as a flat plate;

a returning portion connected to the main plate and providing a return force resulted from elasticity of the returning portion when the brake pad moves;

a load supporting portion connected to the main plate and elastically supporting a load of the brake pad; and a sliding portion connected to the main plate and rubbing against an inner surface of the guide groove when the brake pad moves, wherein the returning portion includes a first end portion extending from the main plate and a second end portion supporting a fixed area of the brake caliper.

2. The return spring of claim 1, wherein the sliding portion extends parallel to a moving direction of the brake pad from the main plate, and wherein the sliding portion is in surface contact with the brake pad and in surface contact with the inner surface of the guide groove.

3. The return spring of claim 2, wherein the sliding portion is in surface contact with a top surface of the guide groove and a front surface of the brake pad.

4. The return spring of claim 3, wherein the load supporting portion includes a first end portion extending from the main plate and a second end portion supporting a bottom surface of the guide groove.

5. The return spring of claim 4, wherein the load supporting portion is curved at a predetermined angle with respect to the main plate, and the load supporting portion applies a force to a bottom surface of the guide groove using elasticity.

6. The return spring of claim 5, wherein the load supporting portion is connected to the main plate from a side opposite to the sliding portion.

7. The return spring of claim 1, wherein the returning portion has a curved section, and wherein the second end portion of the returning portion includes a curved surface in a portion for supporting the fixed area.

8. The return spring of claim 7, wherein the returning portion includes a first section curved at a first portion of the returning portion at a first angle and a second section curved at a second portion of the returning portion at a second angle, and wherein a sum of the first angle and the second angle is at least 180 degrees.

9. The return spring of claim 8, wherein the returning portion is connected to a partial section of an upper edge of the main plate, and wherein the sliding portion is connected to a remaining section of the upper edge of the main plate.

10. The return spring of claim 9, wherein the main plate includes a hole defined therein for connection with the brake pad.

11. A brake pad with the return spring of claim 10, the brake pad comprising:

a plurality of protruding portions protruding in a lateral direction symmetrically with respect to a pad surface.

12. The brake pad of claim 11, wherein each protruding portion includes a protrusion, and wherein the protrusion passes through the hole defined in the main plate of the return spring.

13. The brake pad of claim 12, wherein a top surface and a front surface of the protruding portion are in contact with the sliding portion of the return spring.

14. The brake pad of claim 13, wherein a distance between a top surface and a bottom surface of the guide groove is greater than a vertical dimension of the protruding portion, but smaller than a distance from the sliding portion of the return spring to an end of the load supporting portion.

15. The brake pad of claim 13, wherein a vertical distance between the sliding portion and an end of the load supporting portion is greater than a distance between a top surface and a bottom surface of the guide groove.

16. A brake caliper equipped with the brake pad of claim 13, the brake caliper comprising:

a pad carrier having the guide groove defined therein for guiding each protruding portion of the brake pad in a front and rear direction, wherein the pad carrier is fixed to a knuckle assembly of a vehicle wheel.

17. The brake caliper of claim 16, wherein the pad carrier and the return spring are made of steel use stainless (SUS).

18. The return spring of claim 8, wherein the returning portion includes a first end connected to an upper edge of the main plate, and the first section extending in a rearward direction thereof and then being curved in a downward direction thereof, and the second section extending in the downward direction and then being curved in a forward direction thereof.

19. The return spring of claim 1, wherein an end of the sliding portion is bent be in contact with a front surface of a protruding portion in the brake pad.

* * * * *